E. G. SMITH & J. J. DOSSERT.
HOUSING FOR ELECTRICAL APPLIANCES.
APPLICATION FILED JUNE 18, 1914.
1,275,777. Patented Aug. 13, 1918.
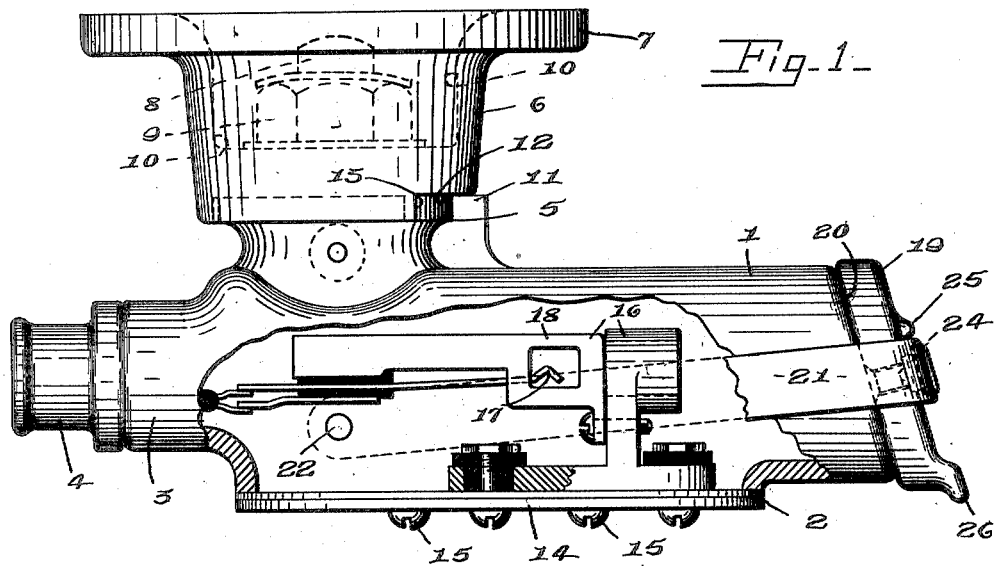
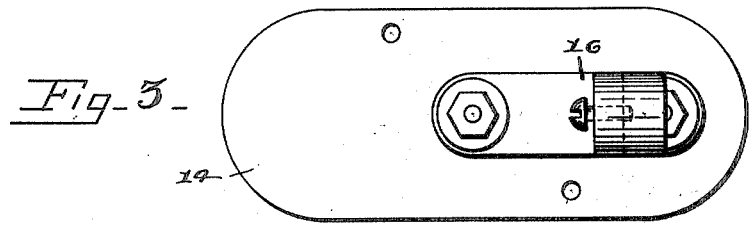
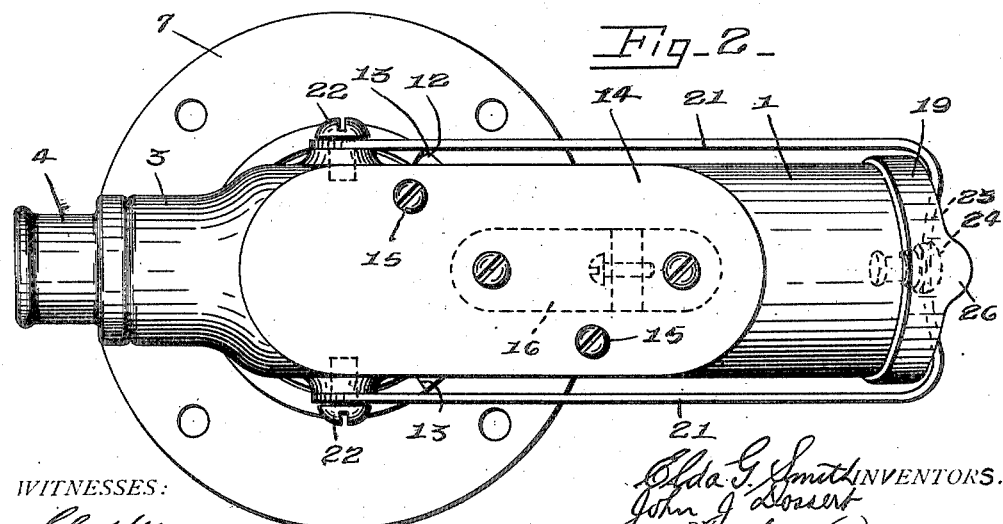

UNITED STATES PATENT OFFICE.

ELDA G. SMITH AND JOHN J. DOSSERT, OF SYRACUSE, NEW YORK, ASSIGNORS TO CROUSE-HINDS COMPANY, OF SYRACUSE, NEW YORK, A CORPORATION OF NEW YORK.

HOUSING FOR ELECTRICAL APPLIANCES.

1,275,777.      Specification of Letters Patent.      Patented Aug. 13, 1918.

Application filed June 18, 1914. Serial No. 845,800.

*To all whom it may concern:*

Be it known that we, ELDA G. SMITH and JOHN J. DOSSERT, citizens of the United States, and residents of Syracuse, in the county of Onondaga and State of New York, have invented a certain new and useful Housing for Electrical Appliances, of which the following is a specification.

This invention has for its object a housing for an electrical appliance, particularly adapted for housing a telephone jack used in connection with railway cars, and it consists in the novel features of construction hereinafter set forth and claimed.

In describing this invention, reference is had to the accompanying drawings, in which like characters designate corresponding parts in all the views.

Figure 1 is an elevation, partly broken away, of this housing with an electrical appliance, as a telephone jack, mounted therein.

Fig. 2 is an inverted plan view of parts seen in Fig. 1.

Fig. 3 is a plan view of the detached cover with telephone jack thereon.

Our housing for electrical appliances includes a box having a lengthwise opening through which the electrical appliance is inserted and removed, a cover for the opening on which cover the electrical appliance is mounted, the box being also formed with a wire opening in one end and an opening in its other end for permitting the movement of an electrical appliance into and out of coaction with the appliance in the box when the cover is in its operative position or attached to the box.

More specifically, this housing includes a box 1 in the general form of a tube or a conduit, and has an opening 2 at one side, as its lower side, and a nipple 3 at one end for connection with a plug 4 permanently secured therein and which mechanically connects feed wires to the box, which wires are electrically connected to the terminals of the telephone jack. These wires may be inclosed in a flexible tube or conduit, not shown, which is secured to the nipple 3. The end of the box opposite to that at which the nipple is located is open for permitting the insertion of a plug in the telephone jack.

5 is a bearing on the upper side of the box 1, which bearing is connected by a swivel to a bracket 6 having a flange 7 for securement to the underside of the floor of the car, the bracket 6 and the bearing 5 having opposing surfaces which engage each other, and the bearing 5 having an upwardly extending swivel pin 8 journaled in the bracket 6 and held from displacement by a nut 9 screwing on the upper end thereof. The nut 9 and the upper end of the pin 8 are located within the socket 10 opening through the upper face of the bracket 6.

The swiveling movement of the box 1 and pin 8 in the bracket 6 is limited by a stop 11 provided on the bearing 5 and extending into an elongated recess or notch 12 formed in the lower end of the bracket 6, the stop engaging opposite end walls 13 of said recess, which end walls limit the turning movement of the box 1.

14 is a cover for the open side of the box, this cover being in the form of a plate held in position by suitable screws 15 extending into the margin of the cover 14 and into holes provided in the box 1. 16 is the telephone jack of any well known construction, the telephone jack being mounted on the cover 14 and having opposite terminals 17, 18.

19 is a closure for the open end of the box, the edge at such open end being inclined or beveled, as shown at 20 and inclining downwardly and outwardly toward the end of the box. 21 is a pivoted support for the closure, the closure being loosely connected to this support so that it will adjust itself to fit tightly the inclined edge 20 when it falls into its closed position. The support 21, as here shown, is in the form of a bail arranged astride the box 1 and pivoted at 22 to opposite sides thereof and having its intermediate portion arranged to extend across the open end of the box. The pivots 22 are so located that the closure moves in an arc across the open end of the box and into wedging engagement with the inclined edge 20.

As here shown, the axis of the pivots 22 is located below a horizontal line passing through the point of connection of the bail and closure and in a plane arranged at a right angle to a place coincident with a bevel edge 20, this arrangement facilitating the closing movement of the closure.

The central part of the intermediate portion of the bail is curved inwardly to form a convex bearing 23 on the inner side thereof, and the closure 19 is loosely connected by a single fastening member 24 located at its center to the convex bearing 23 and bears against the support or bail 21 only at such bearing 23 so that the closure has a universal adjusting movement, that is, an adjusting movement in all directions, and will snugly fit the inclined edge 20. In order to prevent the closure from turning, suitable lugs 25 are provided thereon which engage the upper edge of the intermediate portion of the bail. An out-turned lip 26 is provided on the lower edge of the closure 19 by which the closure can be raised out of its closed position.

In operation, when the train enters a station, telephone connection can be made with the local circuit through the jack 16 by inserting a plug connected to the local circuit through the open end of the box 1 between the terminals 17, 18 of the jack 16, the cover 19 being raised by hand for permitting the insertion of the plug. If the train starts before the plug is removed, the box 1 will swivel until it is in a straight line with the wires connected to the plug of the local circuit, which wires are usually located between the rails, and as the train continues to move the plug will be withdrawn, and the closure 19, which has been held up by the plug will fall by gravity to close the open end of the box, and owing to the arrangement of the pivot of the bail 21 for the closure and the bevel edge 20 of the box, the cover will snugly fit the box at all points along the edge of the box.

What we claim is:—

1. A housing for electrical appliances comprising an elongated box having a lengthwise opening in one of its long sides through which the electrical appliance is inserted and removed, a cover for the opening, the box being also formed with a wire opening in one end and an opening in its other end for permitting the movement of an electrical appliance into and out of coaction with the appliance in the box when the cover is in its operative position, substantially as and for the purpose specified.

2. A housing for electrical appliances comprising an elongated box swiveled between its ends and having an opening in one of its long sides through which the electrical appliance is inserted and removed, a cover for the open side, the box being also formed with a wire opening in one end and an opening in its other end for permitting the movement of an electrical appliance into and out of coaction with the appliance in the box, substantially as and for the purpose set forth.

3. A housing for electrical appliances comprising a box having an opening in one side thereof through which the electrical appliance is inserted and removed, a cover for the open side, said electrical appliance carried by the cover, the box being also formed with a wire opening in one of the sides arranged at an angle to the open side and with an opening in another side arranged at an angle to the open side, the latter opening permitting the movement of an electrical appliance into and out of coaction with the appliance in the box, substantially as and for the purpose described.

4. A housing for electrical appliances comprising an elongated box having an opening in one of its long sides through which the electrical appliance is inserted and removed, a cover for the open side, said electrical appliance carried by the cover, the box being also formed with a wire opening in one end and an opening in its other end for permitting the movement of an electrical appliance into and out of coaction with the appliance in the box, substantially as and for the purpose specified.

5. A housing for electrical appliances comprising an elongated box in the general form of a pipe having an elongated opening in one side, a closure for the opening in said side, an electrical appliance carried by the closure within the box and having terminals extending toward opposite ends of the box, wires extending in one end of the box for connection with terminals of the appliance, the appliance having means exposed at the other end of the box for receiving an electrical appliance movable through the latter open end, substantially as and for the purpose set forth.

6. A housing for electrical appliances comprising an elongated box in the general form of a pipe having an elongated opening in one side, a closure for the opening in said side, an electrical appliance carried by the closure within the box and having terminals extending toward opposite ends of the box, wires extending in one end of the box for connection with terminals of the appliance, the appliance having means exposed at the other open end of the box for receiving an electrical appliance movable through the latter open end, in combination with a support and a swivel joint connecting the box to the support, the axis of the swivel being arranged at an angle to the lengthwise axis of the box, substantially as and for the purpose described.

7. A housing for an electrical appliance comprising a box having an opening for the insertion and removal of an electrical appliance into and out of engagement with an appliance in the box, the box having the edge wall around such opening arranged at an incline, a closure movable over the inclined edge of the box, and a movable carrier or support for the closure, the closure being connected to the support by a joint having a universal action, substantially as and for the purpose described.

8. A housing for an electrical appliance comprising a box having an opening for the insertion and removal of an electrical appliance into and out of engagement with the appliance in the box, the box having the edge wall around such opening arranged at an incline, a movable carrier or support for the closure, such support or carrier including a portion extending crosswise of the end of the box when the closure is in its normal position and said portion having a convex bearing face on its inner side engaging the closure near the center thereof, and means for loosely securing the cover to said portion, substantially as and for the purpose specified.

9. A housing for an electrical socket comprising a box having an opening at one end for the insertion of an electrical appliance into the box, the box having the edge wall at such end arranged on an incline or bevel, a closure movable over the inclined edge of the box, and a pivoted support for the closure, the support being in the form of a bail arranged astride the box and pivoted at its opposite ends thereto, the intermediate portion of the bail being arranged to extend across the open end of the box, and said intermediate portion of the bail having a convex bearing on its inner side and the bearing engaging the closure near the center thereof, and means for loosely securing the cover at its center to the bearing, substantially as and for the purpose described.

10. A housing for an electrical socket comprising a box having an opening at one end for the insertion of an electrical appliance into the box, the box having the edge wall at such end arranged on an incline or bevel, a closure movable over the inclined edge of the box, and a pivoted support for the closure, the support being in the form of a bail arranged astride the box and pivoted at its opposite ends thereto, the intermediate portion of the bail being arranged to extend across the open end of the box, and said intermediate portion of the bail having a convex bearing on its side and the bearing engaging the closure near the center thereof, and means for loosely securing the cover at its center to the bearing, the pivots connecting the bail and the box being located below a horizontal line passing through the point of connection of the closure, and the bail when the closure is in its operative position, substantially as and for the purpose specified.

In testimony whereof, we have hereunto signed our names in the presence of two attesting witnesses, at Syracuse, in the county of Onondaga, in the State of New York, this 17th day of April, 1914.

ELDA G. SMITH.
JOHN J. DOSSERT.

Witnesses:
WM. CORNELL BLANDING,
C. C. SCHOENECK.